United States Patent Office 3,474,058
Patented Oct. 21, 1969

3,474,058
COMPOSITIONS COMPRISING ETHYLENE-VINYL ACETATE COPOLYMER, FATTY ACID SALT AND FATTY ACID AMIDE
Lee R. Ridgeway, Cincinnati, Ohio, and Joseph Fischer, Urbana, Ill., assignors to National Distillers and Chemical Corporation, New York, N.Y., a corporation of Virginia
No Drawing. Filed Jan. 19, 1966, Ser. No. 521,538
Int. Cl. C08f 45/00, 37/04
U.S. Cl. 260—23
5 Claims

ABSTRACT OF THE DISCLOSURE

A polyolefin composition including in combination an ethylene-vinyl acetate copolymer, a metal salt of a fatty acid and an amide of a fatty acid.

---

This invention relates to polyolefin compositions having improved slip and non-blocking properties. More particularly, the invention relates to ethylene/vinyl acetate copolymer compositions whose normally high film-to-film coefficient of friction is reduced by incorporating into said composition a metal salt of a fatty acid in combination with at least one fatty acid amide.

The use of low density polyethylene for film applications necessitated the development of improvements in certain characteristics of the film. In order to permit the use of polyethylene films on high speed bag making and other machinery, it was necessary to develop films with improved slip characteristics, that is, the ability of the film to slide smoothly and quickly over metal or other surfaces or over another layer of film. In addition, additives were used to prevent blocking, that is, the tendency of film to cling to itself on the roll and thus to resist separation by any peeling force. A suitable slip agent or combination of slip and anti-block agents in polyolefins will impart a controlled and desired level of slip to the film and will not impair the optical properties of the product.

The blocking and slip tendencies of polyolefin films have been improved by the incorporation into the resin of various fatty acid amides, such as oleamides, stearamides, and so forth.

The use of materials known to be effective mold release agents, e.g., metallic stearates, has not been feasible in the polyethylene film industry because of the limited compatibility of the polymer with foreign substances. Excessive plate-out on the surface of dies and rolls in fabricating equipment and the heavy surface layer of such deposits on the film are undesirable.

Inorganic silica compounds have been tried as anti-blocking agents with some degree of success; if, however, large amounts of the compound are used or if the particle size is too large, the haze of the polymer film is increased.

Because of their inherent flexibility and elastomeric properties, ethylene/vinyl acetate copolymers present greater problems than polyethylene in producing films with adequate slip characteristics. Many copolymers of ethylene and vinyl acetate will produce films with excellent clarity, toughness, low temperature properties, and other desirable characteristics, but with a very strong tendency toward blocking. If the commonly used and accepted polyethylene slip and anti-block agents, e.g., oleamides or stearamides are incorporated into the ethylene/vinyl acetate copolymer in the concentrations normally used, these additives are not effective. If it is attempted to remedy this by greatly increasing the amount of fatty acid amide, the product tends to have a greasy feel and to exhibit undesirable wet blocking. In addition, the organic amides alone do not appear to impart sufficient anti-block properties to the copolymer films. If high concentrations of inorganic anti-block agents are used, the product becomes very hazy and loses the desirable transparency and optical sparkle desirable for many applications.

It has thus not been found possible to improve the slip and anti-block properties of an ethylene/vinyl acetate copolymer film without impairing its other desirable properties by taking the best of the slip or anti-block compositions now used with polyethylene or by either increasing or decreasing the constituents of the additive compositions.

It is, therefore, an object of this present invention to provide an ethylene/vinyl acetate copolymer resin film composition having improved slip and anti-block characteristics.

An additional object is to provide an ethylene/vinyl acetate copolymer composition wherein film made therefrom has improved slip and anti-blocking characteristics and wherein other physical properties of the film, such as clarity, permeability, sealability, printability, and the like, are substantially unaffected.

A further object of this invention is to provide ethylene/vinyl acetate copolymer resins that can be converted into films by standard processing techniques, such as are used to make tubular or cast film, and to impart thereto a balance of slip and anti-block characteristics without impairing other desirable characteristics, such as optical properties.

Other objects will become apparent from the following detailed description.

In accordance with this invention, plastic compositions, particularly solid copolymers of ethylene and vinyl acetate, are given improved slip and anti-blocking properties by incorporating into such compositions a small amount, based upon the weight of said plastic compositions, of a metal salt, of a fatty acid in combination with a fatty acid amide.

The amounts of metal salt and fatty acid amide used may be varied over a wide range, depending upon the desired improvement in slip and anti-block properties. In general about 0.01 to about 4 percent of the metal salt plus about 0.1 to about 0.8 percent of the fatty acid amide, based on the weight of the polyolefin composition, will give satisfactory results. Preferably about 1.0 to 2.0 percent of the metal salt and about 0.1 to 0.2 percent of the fatty acid amide are used. If desired, however, less than 0.1 and more than 4 percent of the metal salt and less than 0.1 and more than 0.8 percent of the fatty acid amide can be used without deleterious results. The optimum quantity of the metal salt depends upon the amount of vinyl acetate in the copolymer being treated.

The improved compositions embodied herein can be prepared by any of several suitable methods known in the art for providing a uniform mixture of a plastic and additive materials to impart a desired property. Such methods include the addition of the stated amides and metal salts as a solid, in solution in inert solvent, or as a slurry in a non-solvent to the plastic in either dry fluff or molding powder form, followed by drying and tumbling. The stated amide and salt additives can also be incorporated into the plastic by melt blending the ingredients in conventional apparatus, such as a Banbury mixer, heated rolls, etc. The salt and the amide can be added to the plastic composition separately, or they can be premixed and the mixture of metal salt and amide added to the plastic composition.

Suitable metal salts are those of fatty acids having from about 12 to about 22 C atoms, such as for example zinc, calcium, aluminum, magnesium, and lithium laurate; zinc, calcium, aluminum, magnesium, and lithium behenate; zinc, aluminum, magnesium, dibasic lead, cerium, and calcium stearate; zinc palmitate; and combinations thereof. Fatty acid amides that give good results when combined with the metal salts are the amides of fatty acids having from about 12 to about 22 C atoms, such as, for example, laurylamide, palmitylamide, oleylamide, stearylamide, linoleylamide, erucylamide, behenylamide, and mixtures of these.

The compositions of this invention contain essentially a film-forming copolymer of ethylene and vinyl acetate, at least one metal salt, and at least one fatty acid amide. Other conventional polyolefin film resin components, such as lubricants, antistatic agents, antioxidants, colorants, and so forth, can be added to the composition provided, however, that the added amount of these ingredients is insufficient to alter substantially the slip and anti-blocking properties of the compositions.

In order to illustrate the marked improvement in slip properties and in anti-blocking properties imparted to plastic compositions by the practice of this invention, cast films were prepared from solid ethylene/vinyl acetate copolymers to which had been added at least one metal salt and at least one fatty acid amide and tested as follows:

Roll openability

This test evaluates the ease of unrolling a roll of cast film stored at room temperature and is determined as a function of how the film opens or falls away from the roll. Zero roll openability is defined as complete blocking, that is, it is not possible to separate the film from the roll without exerting a force or tearing action. At 100 percent roll openability, the film falls freely from the roll as the roll is unwound. Fifty percent roll openability is defined as follows: 10 feet is divided by the thickness of the film in mils. This length is allowed to hang free as the roll is unwound. If the weight of this free-hanging material is more than enough to unroll the film, the roll openability is greater than 50 percent. If not, the roll openability is less than 50 percent. In this test, a roll openability of 70 percent or greater is regarded as acceptable.

Jungle block

The jungle block openability test is determined by placing a small stack of film, usually 20 sheets or layers, between two steel plates, 8" by 14" and weighing 11 pounds and 11 ounces. The stack is placed in an oven at 100° F. for 24 hours. Samples are then removed, allowed to cool, and the ease of openability is measured. A jungle block openability of greater than 25 percent is considered acceptable. Film which falls open between the fingers when picked up is considered ot have 100 percent openability, whereas film which cannot be opened when worked between the fingers has zero openability.

Extent mottled

This is a qualitative test used to rate the unevenness or blotchiness of the film. It is rated, generally by a panel of three, as very heavy, heavy, medium, slight, very slight, and none. A rating of medium is regarded as acceptable for most applications. The following data illustrate the improvement in slip and anti-blocking properties imparted to a film by the incorporation of at least one metal salt and at least one fatty acid amide in an ethylene/vinyl acetate copolymer composition having a melt index of 1.5 and a density of 0.937 g./cc. Included for comparative purposes are results of tests made on films prepared from an ethylene/vinyl acetate resin plus only one of the two additives required for this invention.

TABLE

| Run | Additive | Amount, percent | Film thickness, mils | Roll openability, percent 1 week | Roll openability, percent 1 month | Jungle Block, percent | Haze, percent | Extent mottled |
|---|---|---|---|---|---|---|---|---|
| 1 | None | | 4 | 36 | 22 | 17 | 3.0 | None. |
| 2 | Zinc stearate | 2 | 4 | 73 | 62 | 22 | 2.3 | Slight. |
| 3 | Aluminun stearate | 2 | 4 | 53 | 30 | 23 | 2.0 | Medium. |
| 4 | Polybutene/wax dispersion | 1 | 4 | 28 | 33 | 27 | 2.3 | Slight. |
| 5 | Ethylene bis stearamide / Behenylamide | 2 / 0.1 | 4 | 65 | 62 | *25W | 3.4 | Slight. |
| 6 | Behenylamide / Erucylamide | 0.2 / 0.1 | 4 | 26 | 43 | 27 | 2.2 | Slight. |
| 7 | Mineral filler / Behenylamide / Erucylamide | 0.1 / 0.2 / 0.1 | 4 | 50 | 32 | 25 | 2.6 | Very slight. |
| 8 | Zinc stearate / Erucylamide | 1 / 0.1 | 4 | 67 | 57 | 55 | 1.2 | Very slight. |
| 9 | Zinc stearate / Erucylamide | 1 / 0.2 | 4 | 64 | 50 | 55 | 2.9 | Medium. |
| 10 | Zinc stearate / Erucylamide | 2 / 0.1 | 4 | 71 | 80 | 38 | 2.5 | Slight. |
| 11 | Zinc stearage / Erucylamide | 2 / 0.2 | 4 | 90 | 95 | 70 | 3.0 | Medium. |
| 12 | Zinc stearate / Erucylamide | 4 / 0.2 | 4 | 86 | 93 | 72 | 1.7 | Medium. |
| 13 | Zinc stearate / Behenylamide | 2 / 0.4 | 4 | 76 | 90 | 63 | 1.9 | Slightly grainy. |
| 14 | Calcium stearate / Erucylamide | 2 / 0.1 | 4 | 40 | 43 | 27 | 2.2 | Medium. |
| 15 | Calcium stearate / Erucylamide | 4 / 0.2 | 4 | 44 | 43 | 28 | 1.8 | Medium grainy. |
| 16 | Aluminum stearate / Erucylamide | 2 / 0.4 | 4 | 55 | 42 | 32 | 2.5 | Medium. |
| 17 | Zinc stearate / Aluminum stearate / Erucylamide | 1 / 1 / 0.4 | 4 | 60 | 60 | 45 | 2.7 | Medium. |

*Wet block.

Additional runs were made using combinations of various amounts of zinc laurate, zinc palmitate, or zinc behenate with various amounts of oleylamide, palmitylamide, linoleylamide, or laurylamide. The results obtained were comparable to those in the table using zinc stearate, calcium stearate, or aluminum stearate with erucylamide or behenylamide.

From these data it can be seen that in general the use of a combination of at least one metal salt of a fatty acid having about 12 to 22 C atoms plus at least one amide of a fatty acid having about 12 to 22 C atoms results in a film that has both improved slip and anti-blocking properties with no detrimental effect on the appearance and the optical properties of the film. In addition to giving a product film that is superior to one made from a copolymer resin containing no slip additive (run 1), the copolymer resin compositions of this invention yield films that are superior to those made from resin compositions containing only a metal salt of a fatty acid (runs 2 and 3) and to those made from resin compositions containing only amides of a fatty acid (runs 4, 5, 6, and 7).

While there are above disclosed but a limited number of embodiments of the invention herein presented, it is possible to produce still other embodiments without departing from the inventive concept herein disclosed. It is desired, therefore, that only such limitations be imposed on the appended claims as are stated therein.

What is claimed is:

1. A polyolefin composition comprising an ethylene vinyl acetate copolymer, an amount effective to improve the slip tendencies of said copolymer, of at least one metal salt of a saturated fatty acid having about 12 to 22 C atoms, and at least one amide of a fatty acid having about 12 to 22 C atoms.

2. The composition of claim 1 wherein the metal salt is present in an amount between 0.01 and 4 percent, based on the weight of the copolymer, and the amide of the fatty acid is present in an amount between about 0.05 and 0.8 percent, based on the weight of the copolymer.

3. The composition of claim 1 wherein the metal salt is selected from the group consisting of zinc stearate, calcium stearate, aluminum stearate, zinc laurate, zinc palmitate, zinc behenate, and mixtures of these and the amide of the fatty acid is selected from the group consisting of erucylamide, palmitylamide linoleylamide, behenylamide, laurylamide, oleylamide, stearylamide, and mixtures of these.

4. The composition of claim 1 wherein the metal salt is present in an amount between about 1.0 and 2.0 percent, and the amide of the fatty acid is present in an amount between about 0.1 and 0.2 percent, based on the weight of the copolymer.

5. A polyolefin composition having improved slip and anti-blocking properties comprising an ethylene/vinyl acetate copolymer; about 0.01 to 4 percent, based on the weight of the copolymer, of at least one metal salt of a fatty acid having about 12 to 22 C atoms selected from the group consisting of zinc stearate, calcium stearate, aluminum stearate, zinc laurate, zinc palmitate, zinc behenate, and mixtures thereof; and about 0.05 to 0.8 percent, based on the weight of the copolymer, of at least one amide of a fatty acid having about 12 to 22 C atoms selected from the group consisting of erucylamide, linoleylamide, behenylamide, laurylamide, palmitylamide, oleylamide, stearylamide, and mixtures thereof.

References Cited

UNITED STATES PATENTS

| | | | |
|---|---|---|---|
| 2,462,331 | 2/1949 | Myers | 260—23 |
| 2,938,879 | 5/1960 | Mock et al. | 260—32.6 |
| 3,205,190 | 9/1965 | Braus et al. | 260—32.6 |
| 3,326,840 | 6/1967 | Ross et al. | 260—32.6 |
| 3,330,796 | 7/1967 | Mock et al. | 260—32.6 |
| 3,362,839 | 1/1968 | Weindel | 106—270 |

DONALD E. CZAJA, Primary Examiner

R. A. WHITE, Assistant Examiner

U.S. Cl. X.R.

260—28.5, 32.6, 41